United States Patent
Bisson et al.

(10) Patent No.: US 10,118,715 B2
(45) Date of Patent: Nov. 6, 2018

(54) SYSTEM AND METHOD FOR AUXILIARY POWER UNIT INLET DOOR TESTING

(71) Applicant: PRATT & WHITNEY CANADA CORP., Longueuil (CA)

(72) Inventors: Jean-François Bisson, St-Amable (CA); Patrick Manoukian, Saint-Laurent (CA); Sarah Theriault, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/440,494

(22) Filed: Feb. 23, 2017

(65) Prior Publication Data

US 2018/0237165 A1   Aug. 23, 2018

Related U.S. Application Data

(60) Provisional application No. 62/461,047, filed on Feb. 20, 2017.

(51) Int. Cl.
| | |
|---|---|
| *B64F 5/60* | (2017.01) |
| *B64D 41/00* | (2006.01) |
| *F01D 17/24* | (2006.01) |
| *F01D 21/00* | (2006.01) |
| *B64D 33/02* | (2006.01) |

(52) U.S. Cl.
CPC ............... *B64F 5/60* (2017.01); *B64D 41/00* (2013.01); *F01D 17/24* (2013.01); *F01D 21/003* (2013.01); *B64D 2033/0213* (2013.01); *F05D 2220/50* (2013.01); *F05D 2260/83* (2013.01)

(58) Field of Classification Search
CPC ... B64F 5/60; B64D 41/00; B64D 2033/0213; F01D 17/24; F01D 21/003; F05D 2220/50; F05D 2260/83
See application file for complete search history.

(56) References Cited

U.S. PATENT DOCUMENTS

| | | | |
|---|---|---|---|
| 6,272,838 | B1 | 8/2001 | Harvell et al. |
| 6,901,737 | B2 | 6/2005 | Schnoor |
| 7,188,275 | B2 | 3/2007 | Ortiz et al. |
| 7,469,545 | B2 | 12/2008 | Riley |
| 7,540,142 | B2 | 6/2009 | Sheoran et al. |
| 8,079,550 | B2 | 12/2011 | Brill et al. |
| 8,141,816 | B2 | 3/2012 | Robbins et al. |
| 8,439,061 | B2 | 5/2013 | Baumann |
| 8,868,354 | B2 | 10/2014 | Lohmann |
| 8,967,530 | B2 | 3/2015 | Gatzke |
| 2010/0293961 | A1* | 11/2010 | Tong ............... F01D 19/00 60/778 |

(Continued)

FOREIGN PATENT DOCUMENTS

CN   101922365   11/2013

*Primary Examiner* — Richard M Camby
(74) *Attorney, Agent, or Firm* — Norton Rose Fulbright Canada LLP

(57) ABSTRACT

A method and system for operating an inlet door of an auxiliary power unit are provided. A control signal comprising at least one inlet door command is output. In response to the at least one inlet door command, at least one feedback signal is received and compared to the at least one inlet door command. If the at least one received feedback signal matches the at least one expected feedback signal, operation of the auxiliary power unit is allowed. Otherwise, operation of the auxiliary power unit is inhibited.

15 Claims, 9 Drawing Sheets

(56) References Cited

U.S. PATENT DOCUMENTS

| | | | |
|---|---|---|---|
| 2012/0312023 A1* | 12/2012 | Ertz | F02C 7/06 |
| | | | 60/772 |
| 2013/0074519 A1 | 3/2013 | Ertz et al. | |
| 2013/0116884 A1 | 5/2013 | Thomson et al. | |
| 2016/0090915 A1 | 3/2016 | Wolff et al. | |
| 2017/0019309 A1 | 1/2017 | Mason | |
| 2017/0335711 A1* | 11/2017 | Marcus | F01D 17/12 |

* cited by examiner

SYSTEM AND METHOD FOR AUXILIARY POWER UNIT INLET DOOR TESTING

CROSS-REFERENCE TO RELATED APPLICATIONS

This patent application claims priority under 35 USC § 119(e) of U.S. provisional Application Ser. No. 62/461,047, filed on Feb. 20, 2017, the contents of which are hereby incorporated by reference.

TECHNICAL FIELD

The application relates generally to auxiliary power units and, more particularly, to testing the inlet door system of an auxiliary power unit.

BACKGROUND OF THE ART

An auxiliary power unit (APU) may be provided with an inlet door that is moveable between a closed position and one or more open positions to allow airflow into the APU and accordingly provide the desired APU functionalities.

In some existing systems, a failure in the APU inlet door system could go undetected prior to allowing operation of the APU. This could lead to APU damage or loss of performance. There is therefore a need for an improved system and method for APU inlet door system testing.

SUMMARY

In one aspect, there is provided a method for operating an inlet door of an auxiliary power unit. The method comprises outputting a control signal comprising at least one inlet door command, receiving, in response to the at least one inlet door command, at least one feedback signal, comparing the at least one received feedback signal to the at least one inlet door command, if the at least one received feedback signal matches the at least one inlet door command, allowing operation of the auxiliary power unit, and inhibiting operation of the auxiliary power unit otherwise.

In another aspect, there is provided a system for controlling an inlet door of an auxiliary power unit. The system comprises a memory, and a processing unit coupled to the memory and configured to output a control signal comprising at least one inlet door command, receive, in response to the at least one inlet door command, at least one feedback signal, compare the at least one received feedback signal to the at least one inlet door command, if the at least one received feedback signal matches the at least one inlet door command, allow operation of the auxiliary power unit, and inhibit operation of the auxiliary power unit otherwise.

In a further aspect, there is provided a non-transitory computer readable medium having stored thereon program code executable by a processor for outputting a control signal comprising at least one inlet door command, receiving, in response to the at least one inlet door command, at least one feedback signal, comparing the at least one received feedback signal to the at least one inlet door command, if the at least one received feedback signal matches the at least one inlet door command, allowing operation of the auxiliary power unit, and inhibiting operation of the auxiliary power unit otherwise.

DESCRIPTION OF THE DRAWINGS

Reference is now made to the accompanying figures in which.

DETAILED DESCRIPTION

Figure 1:
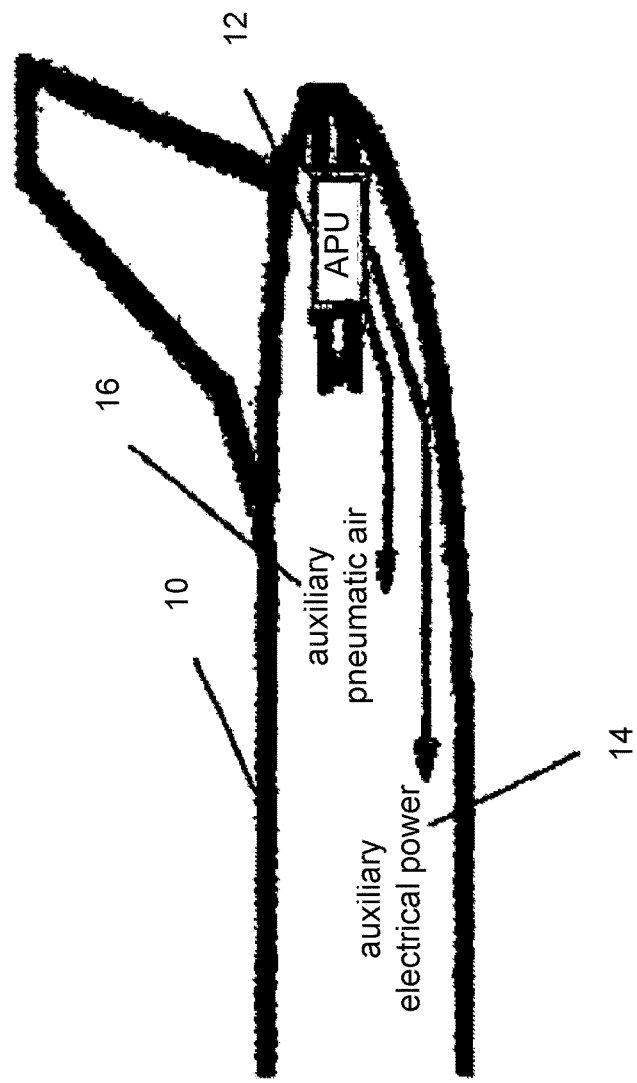
FIG. 1 is a schematic representation of an aircraft including an APU, in accordance with an illustrative embodiment.

Referring to FIG. 1, in one embodiment, an aircraft 10 has mounted thereon an APU 12, which is provided for conventional purposes, including, but not limited to, the provision of electrical power 14 and pneumatic air 16 to the aircraft 10. Among other well-known uses, pneumatic air 16 provided by the APU 12 is used on larger aircraft to provide auxiliary bleed air for starting the aircraft's main engines (not shown).

Figure 2:
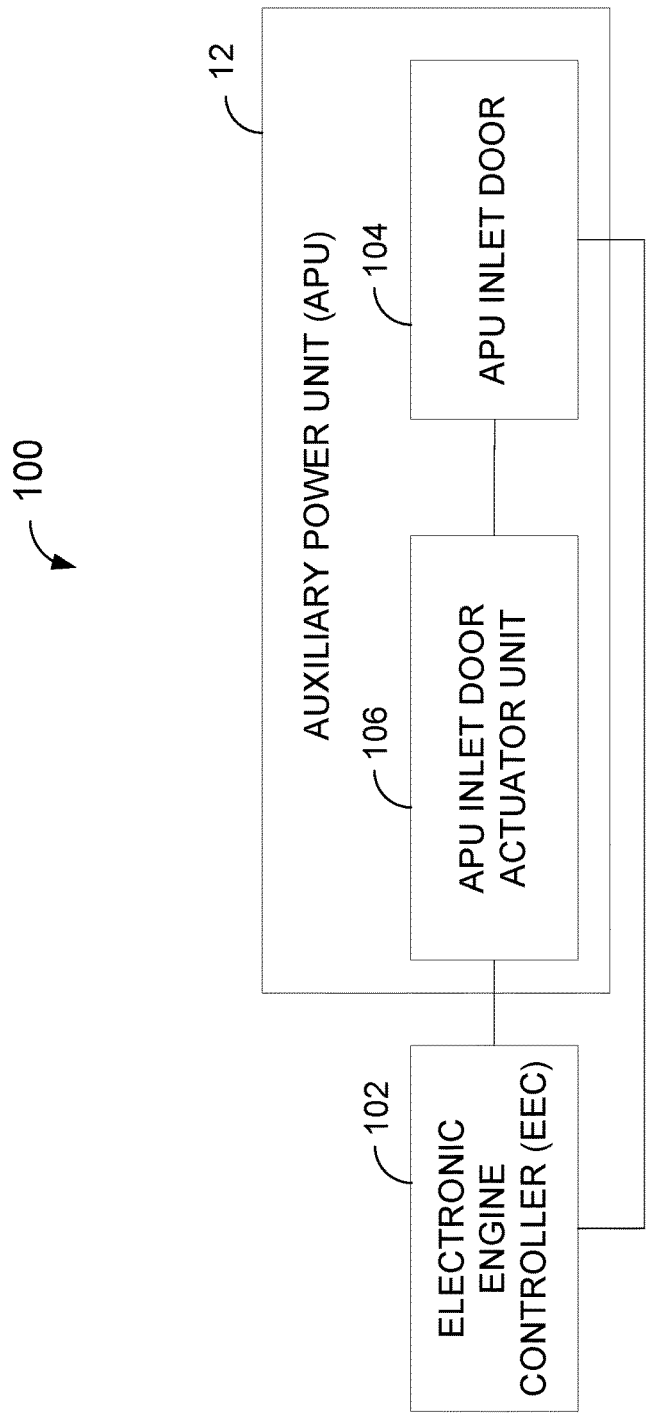
FIG. 2 is a block diagram of a system for auxiliary power unit inlet door testing, in accordance with an illustrative embodiment.

FIG. 2 illustrates an example system 100 for inlet door testing for a gas turbine engine, such as the APU 12 of FIG. 1. As illustrated in FIG. 2, the system 100 comprises an Electronic Engine Controller (EEC) 102, which controls the APU's inlet door 104. The EEC 102 sends commands (e.g. in the form of one or more control signal(s)) to an APU inlet door actuator unit 106, which in turn causes the APU inlet door 104 to be operated as commanded during normal operation. In one embodiment, the APU inlet door actuator unit 106 comprises a computer (not shown) coupled to an actuator (not shown) configured to move the APU inlet door 104 to the commanded position. The commands send by the EEC 102 may comprise a "Not Powered" command, which results in the APU inlet door actuator unit 106 sending no command to the APU inlet door 104 (i.e. not commanding the APU inlet door 104 to any of the predetermined positions). The commands sent by the EEC 102 may also comprise position commands, which cause the APU inlet door 104 to be moved to one or more commanded positions. The APU inlet door 104 is moved between a closed position and one or more open positions in which air is allowed to flow into the APU to provide desired APU functionality. It is desirable for the APU inlet door 104 to be open while the APU is running but closed when the APU is not operating so as to reduce drag to the aircraft in flight and prevent foreign object ingestion while on ground.

In one embodiment, the APU inlet door 104 has at least two predetermined open positions, namely a "Partially Open" position and a "Fully Open" position, with the opening angle of the APU inlet door 104 in the "Fully Open" position being greater than the opening angle of the APU inlet door 104 in the "Partially Open" position. In one embodiment, the opening angle associated with the "Fully Open" position is thirty-five (35) degrees and the opening angle associated with the "Partially Open" position is thirty (30) degrees. It should however be understood that other opening angles may apply. In one embodiment, during normal start, the EEC 102 selects the inlet door opening angle based on the aircraft's airborne status and causes the door position to be transitioned at the end of the APU start in order to allow for immediate load application. The EEC 102 also receives from the APU inlet door actuator unit 106 and/or the APU inlet door 104 feedback of the inlet door's position and/or status (e.g. closed, open, powered, and the like), thereby allowing the EEC 102 to monitor the APU inlet door 104 in real-time.

As will be discussed further below, the system and method described herein allow to test signals associated with the integrity of the inlet door system. In particular, it is proposed herein to test the health of the input and output signals, which are exchanged between the EEC 102 and the APU inlet door actuator unit 106 during normal operation of the APU 12. In one embodiment, the health of all the signals associated with the above-mentioned APU inlet door commands (i.e. the "Fully Open", "Partially Open", "Closed", and "Not Powered" command signals and the corresponding feedback signals) is verified. This is achieved by the EEC 102 sending a sequence of commands to a computer (not shown) of the APU inlet door actuator unit 106 and monitoring the feedback signals received from the APU inlet door actuator unit 106. In a preferred embodiment, the feedback signals are sent by the APU inlet door actuator unit 106 without the latter physically moving the APU inlet door 104. For this purpose, and as will be discussed further below, in one embodiment, the EEC 102 sends a control signal to the APU inlet door actuator unit 106 a control signal indicating that testing of the inlet door system is requested and that feedback signals, which echo the command signals, should be generated with the APU inlet door 104 being physically moved by the APU inlet door actuator.

The received feedback signals are then compared to the commanded signals in order to assess success or failure of the test. In particular, if the received feedback signals match the commanded signals, the EEC 102 can conclude to success of the test and APU operation is allowed (i.e. the EEC 102 will respond to an APU start command). Otherwise, the test is determined to be unsuccessful and a corresponding fault message is output to cause troubleshooting of the APU inlet door actuator unit 106. The fault message may provide an indication of which fault prevents APU start. In addition, APU operation is inhibited (i.e. the EEC 102 will not respond to an APU start command). In one embodiment, testing is performed once after completion of a power-up phase of the EEC 102. In another embodiment, testing is performed several times during operation of the APU. In yet another embodiment, test results are ignored (i.e. the data received in response to the command signals being output is disregarded) if it is determined that the APU inlet door 104 is mechanically locked open.

Figure 3:
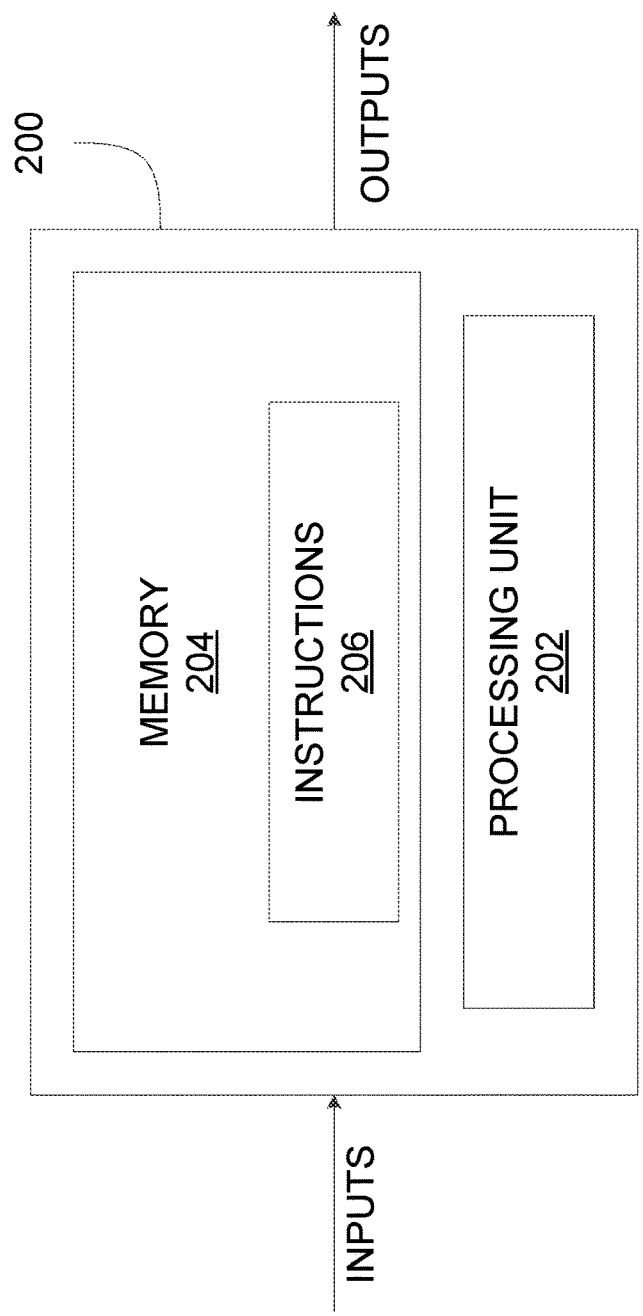
FIG. 3 is a block diagram of a computing device for implementing the electronic engine controller of FIG. 2, in accordance with an illustrative embodiment.

FIG. 3 is an example embodiment of a computing device 200 for implementing the EEC 102 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. In one embodiment, the processing unit 202 has the ability to interpret discrete inputs and energize discrete outputs. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
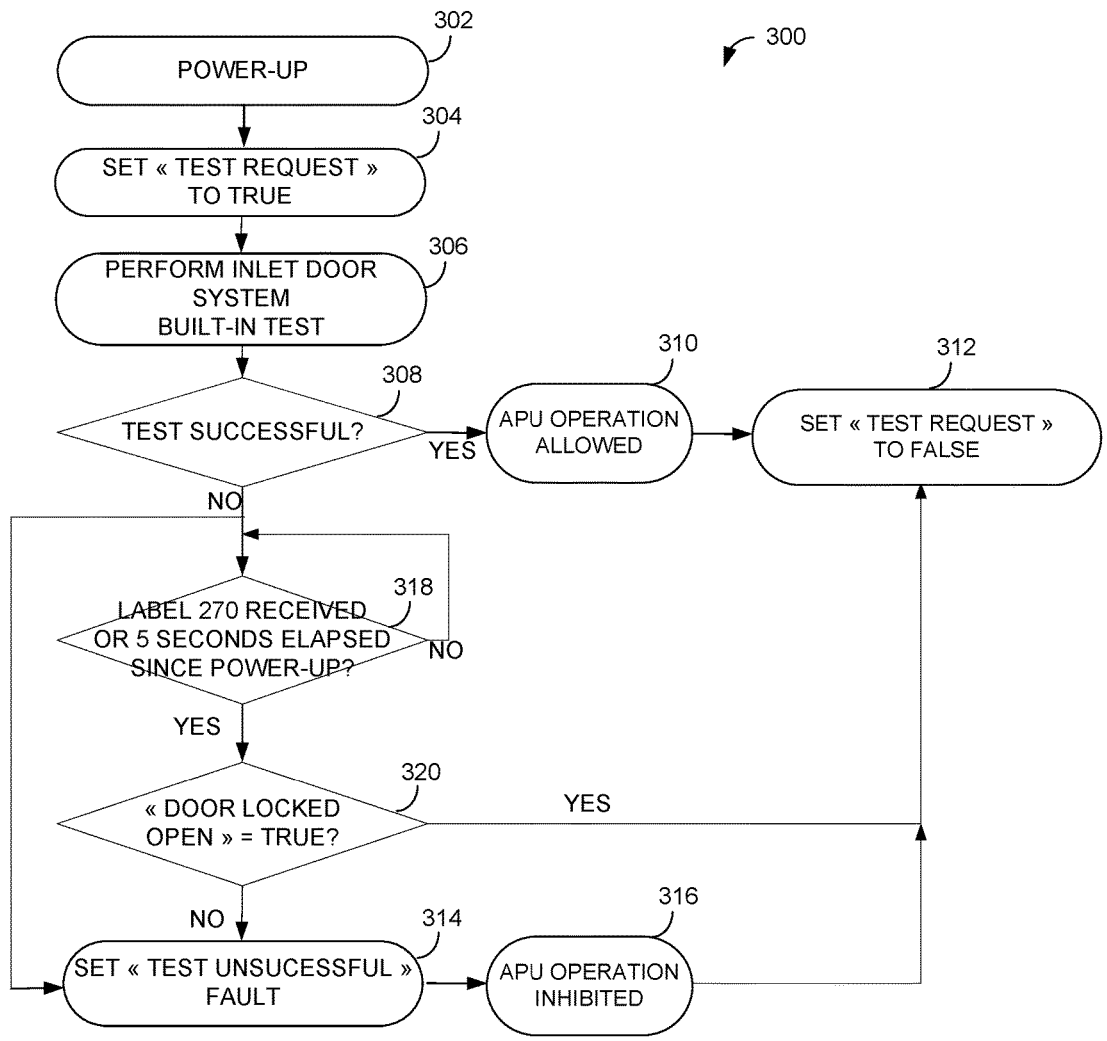
FIG. 4 is a flowchart of a method for auxiliary power unit inlet door testing, in accordance with an illustrative embodiment.

Referring now to FIG. 4, an example method 300 for auxiliary power unit inlet door testing will now be described. The method 300 may be implemented by the computing device 200 of FIG. 3. The method 300 comprises, after completion of a power-up phase of the EEC (step 302), requesting the testing (referred to herein as a "Built-in Test Equipment" or BITE) of the inlet door system at step 304. For this purpose, a corresponding signal (referred to herein as "TEST_REQUEST") is set to "True". In a preferred embodiment, the "TEST_REQUEST" signal is sent to the APU inlet door actuator unit to indicate that the BITE test is requested and prevent motion of the APU inlet door for the duration of the BITE test. It should however be understood that, in some embodiments, motion of the APU inlet door may be allowed.

As will be discussed in further detail below, the inlet door system built-in test is then performed at step 306 and the next step 308 is to assess whether the BITE test is successful. If the test is successful, APU operation is allowed (step 310) and the APU will start upon receipt of a start command. The "TEST REQUEST" signal is then set to "False", indicating that the BITE test is no longer required. If it is determined at step 308 that the test was not successful, a corresponding fault (referred to herein as "TEST UNSUCCESSFUL") is set at step 314 to indicate that the BITE test was unsuccessful and operation of the APU is inhibited at step 316 (i.e. the APU does not start upon receipt of a start command). The method 300 then flows back to step 312 of setting the "TEST_REQUEST" signal to "False", indicating that the BITE test is complete.

In one embodiment, if it is determined at step 308 that the test is not successful, the method 300 optionally determines at step 318 whether the APU inlet door is currently mechanically locked open. In one embodiment, this is achieved by checking bit 27 of a given discrete label (e.g. label 270 of the Aeronautical Radio INC. (ARINC) 429 technical standard). Since the BITE test is performed at EEC power-up, in one embodiment, the method 300 allows for a predetermined period of five (5) seconds for receipt of the discrete label. It should be understood that other embodiments may apply.

For example, the door locked open signal could be received via a discrete input instead of an ARINC label.

If the result of the assessment performed at step 318 is negative, the method 300 repeats the step 318. If the result of the assessment is positive, the next step 320 is to determine whether the signal, which provides an indication as to whether the APU inlet door is locked open (referred to herein as the "DOOR_LOCKED_OPEN" signal), is indicating "True". If this is the case, i.e. the APU inlet door is considered to be mechanically locked open, the results of the BITE test are ignored, and the method 300 flows back to step 312. Otherwise, the "TEST UNSUCCESSFUL" fault is set at step 314 and operation of the APU is inhibited at step 316 (i.e. the APU does not start upon receipt of a start request). The method then flows back to step 312, indicating that the BITE test is complete.

It should be understood that, in some embodiments, steps 318 and 320 may be performed following power-up (step 302) and before setting the "TEST_REQUEST" signal to true (step 304), provided the "DOOR_LOCKED_OPEN" signal, which originates from the aircraft, is available at the time of power-up. This may however prove undesirable as this may lead to the APU start being delayed from having to wait for the "DOOR_LOCKED_OPEN" signal to be received prior to performing the BITE test.

Figure 5:
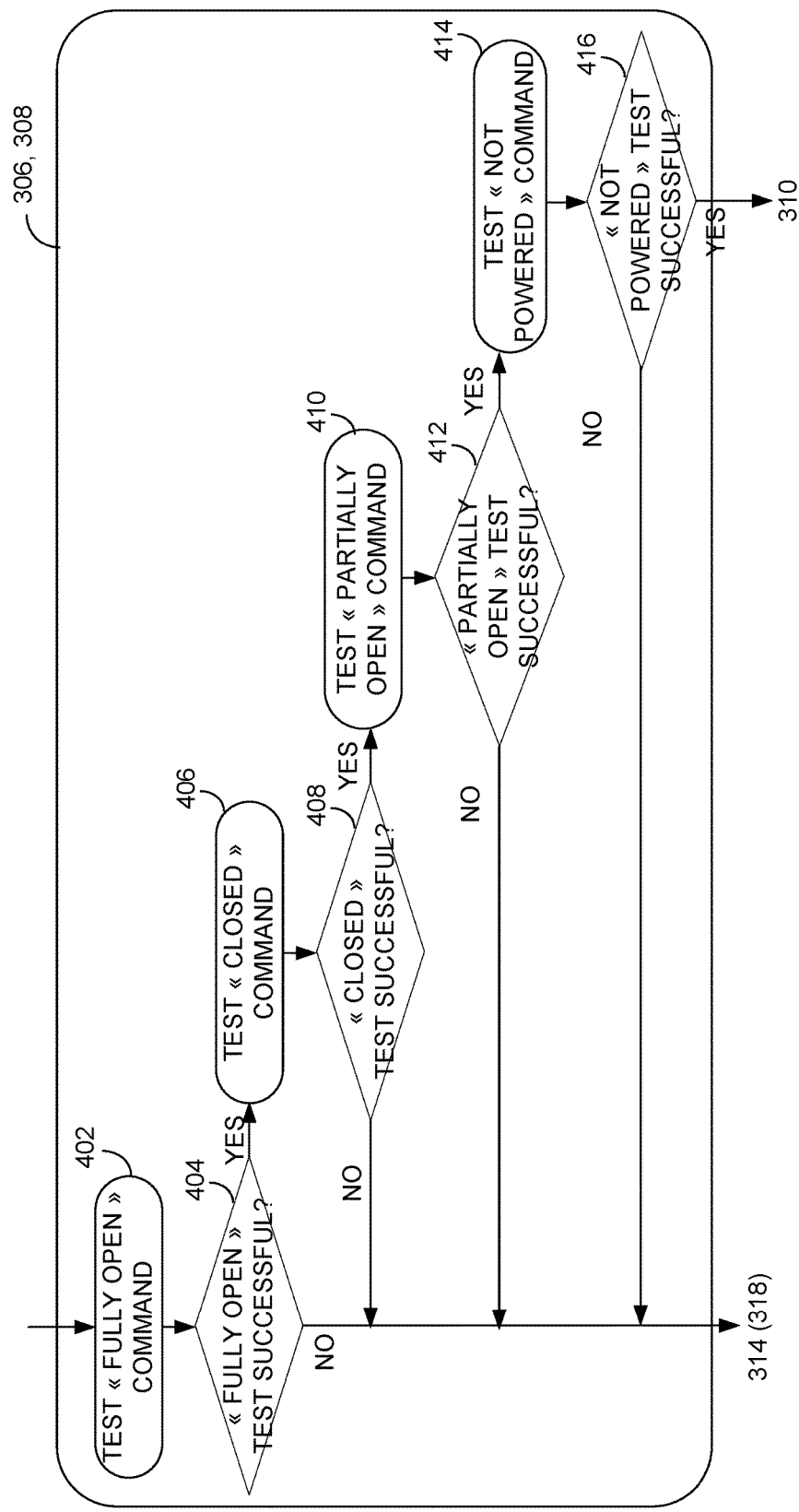
FIG. 5 is a flowchart of the steps of FIG. 4 of performing and assessing the success of an inlet door system built-in-test.

Referring now to FIG. 5, the step 306 of FIG. 4 of performing the inlet door system built-in test and the step 308 of FIG. 4 of assessing whether the test is successful comprise cycling through all commands, namely the "Fully Open" position command, the "Partially Open" position command, the "Closed" position command, and the "Not Powered" command, and evaluating the results. For this purpose, the "Fully Open" command is tested at step 402 and it is assessed at step 404 whether the "Fully Open" command test was successful. If it is the case, the "Closed" command is tested at step 406. The next step 408 is to assess whether the "Closed" command test was successful. If this is the case, the "Partially Open" command is tested at step 410. The next step 412 is to assess whether the "Partially Open" command test was successful. If this is the case, the "Not Powered" command is tested at step 414. The next step 416 is to assess whether the "Not Powered" command test was successful. If this is the case, the method flows to step 310 of FIG. 4 of allowing APU operation. If any of the tests associated with the "Fully Open", "Closed", "Partially Open", and "Not Powered" commands is unsuccessful, the method flows back to step 314 (or optionally step 318) of FIG. 4. It should be understood that the sequence of tested commands may be varied. For example, the "Closed" command may be tested before the "Fully Open" command is tested. The duration of the BITE test may also be modified. In one embodiment, the duration of the BITE test may be decreased, provided the discrete input and output signals associated with all the above-mentioned commands are tested at least once. Other embodiments may apply.

Figure 6:
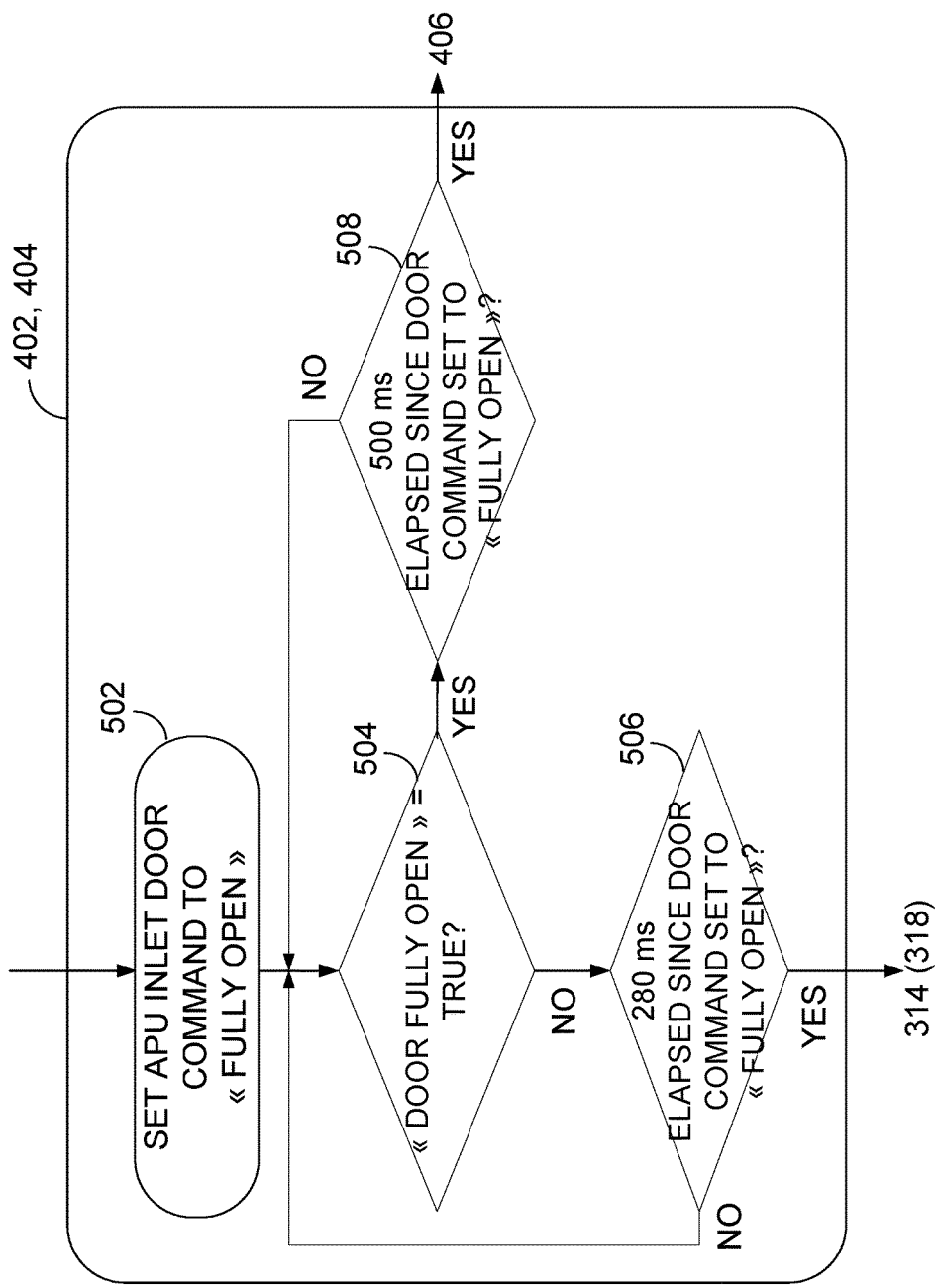
FIG. 6 is a flowchart of the steps of FIG. 5 of testing and assessing the success of a "Fully Open" position command as part of the inlet door system built-in test.

Referring now to FIG. 6, steps 402 and 404 of FIG. 5 of testing the "Fully Open" command and assessing whether the test is successful comprise outputting a control signal comprising instructions to set the APU inlet door command to "Fully Open" (step 502). The next step 504 is then to assess whether the feedback signal associated with the "Fully Open" position command (referred to herein as "DOOR FULLY OPEN" signal) is indicating "True", meaning that the APU inlet door actuator unit output the "DOOR FULLY OPEN" feedback signal in response to receiving the "Fully Open" position command (i.e. echoed the "Fully Open" command signal). If the "DOOR FULLY OPEN" signal is not indicating "True", meaning that the feedback signal was not sent by the APU inlet door actuator unit (i.e. the "Fully Open" command signal was not echoed), the next step 506 is to assess whether a given predetermined time period (referred to herein as a first predetermined time period) has elapsed since the door commanded was set to "Fully Open".

In one embodiment, the first predetermined time period is 280 milliseconds, meaning that, if the feedback signal is currently detected as "false", the method 300 of FIG. 4 waits 280 milliseconds for the feedback signal to be received and match the command signal. Other suitable time periods may apply provided each time period accounts for the estimated time to set a discrete output (e.g. an inlet door command), the estimated time for the APU inlet door actuator unit to respond to the command, the estimated time to read a discrete input (e.g. a feedback signal), and some margin. It should also be understood that the value of the margin may be varied, although, in some embodiments (e.g. in cases where the margin is increased), this may undesirably increase the duration of the overall BITE test and accordingly increase the time required prior to the APU start.

If the result of the assessment performed at step 506 is negative, the method flows back to step 504. Steps 504 and 506 are then repeated until it is determined that the first predetermined time period has indeed elapsed since the door was commanded "Fully Open", in which case the method flows back to step 314 (or optionally step 318) of FIG. 4. In other words, the method assesses at step 506 whether the "DOOR FULLY OPEN" feedback signal is received in a timely manner (i.e. within the first predetermined time period) in order to determine whether the test is successful.

If it is determined at step 504 that the "DOOR FULLY OPEN" feedback signal indicates "True", the next step 508 is to assess whether a given predetermined time period (referred to herein as a second predetermined time period) has elapsed since the door command was set to "Fully Open". In one embodiment, the second predetermined time period is 500 milliseconds. In other words, once the feedback signal corresponds to the command signal (e.g. the proper feedback signal is received (e.g. indicates "True") in response to the command signal being output), the feedback signal is expected to remain as such for a predetermined time period, e.g. 500 milliseconds. Other suitable time periods may apply, provided the second predetermined time period is greater than the first predetermined time period so as to ensure that the feedback signal is healthy (e.g. does not flicker on and off). If it is determined at step 508 that the second predetermined time period has not elapsed since the door command was set to "Fully Open", the method flows back to step 504. Otherwise, the next step 406 of FIG. 5 is to test the "Closed" position command. In other words, the "Fully Open" position command signal is output for the duration of the second predetermined time period.

Figure 7:
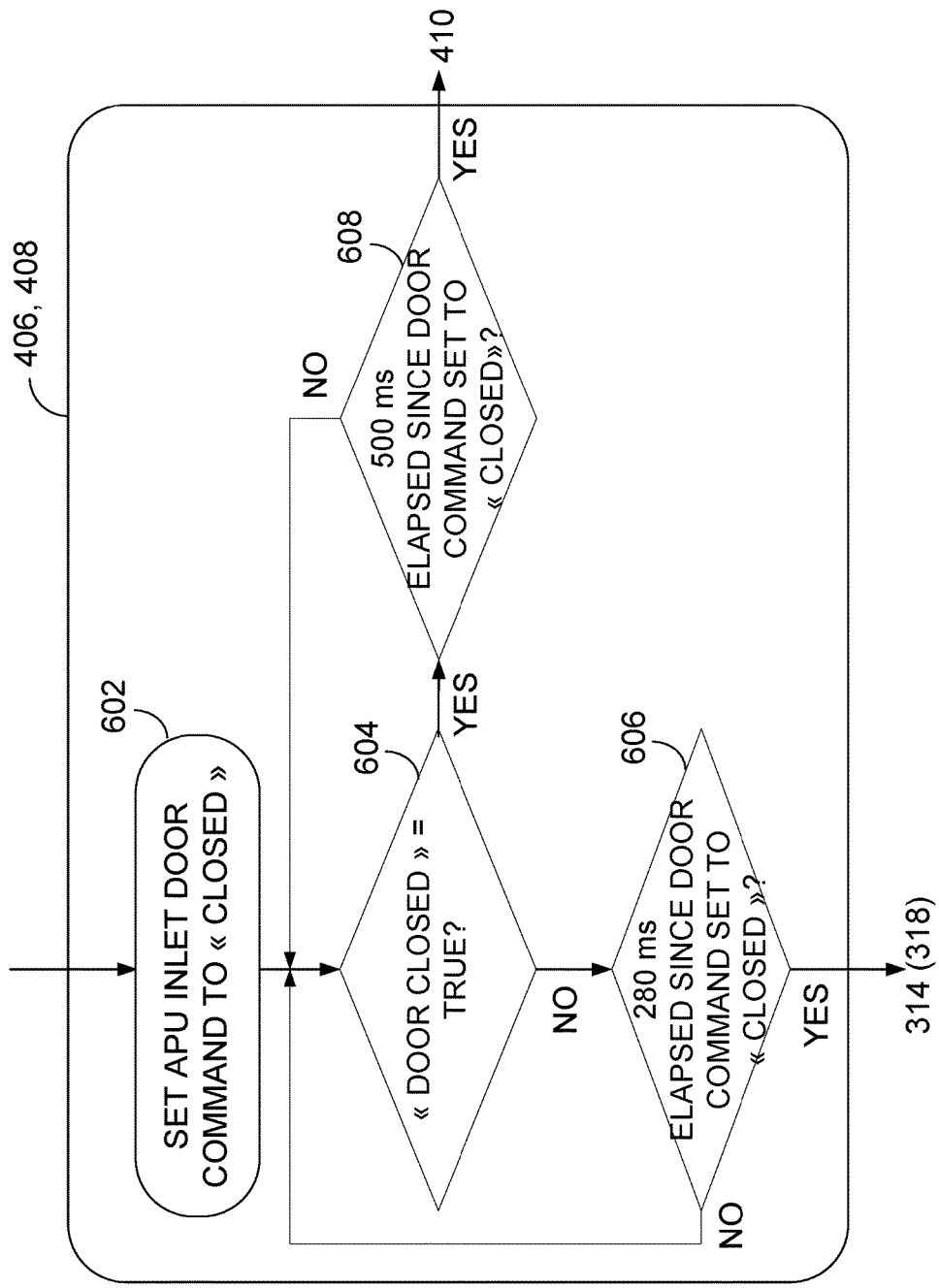
FIG. 7 is a flowchart of the steps of FIG. 5 of testing and assessing the success of a "Closed" position command as part of the inlet door system built-in test.

Referring now to FIG. 7, steps 406 and 408 of FIG. 5 of testing the "Closed" command and assessing whether the test is successful comprise outputting a control signal comprising instructions to set the APU inlet door command to "Closed" (step 602). The next step 604 is to assess whether the feedback signal associated with the "Closed" position command (referred to herein as "DOOR CLOSED" signal) is indicating "True". If this is not the case, the next step 606 is to assess whether the first predetermined time period has elapsed since the door command was set to "Closed". If the result of the assessment performed at step 606 is negative, the method flows back to step 604. Steps 604 and 606 are then repeated until it is determined that the first predetermined time period has indeed elapsed since the door command was set to "Closed", in which case the method flows back to step 314 (or optionally step 318) of FIG. 4. If it is determined at step 604 that the "DOOR CLOSED" feedback signal is indicating "True", the next step 608 is to assess whether the second predetermined time period has elapsed since the door command was set to "Closed". If it is determined at step 608 that the second predetermined time period has not elapsed since the door command was set to "Closed", the method flows back to step 604. Otherwise, the next step 410 of FIG. 5 is to test the "Partially Open" position command.

Figure 8:
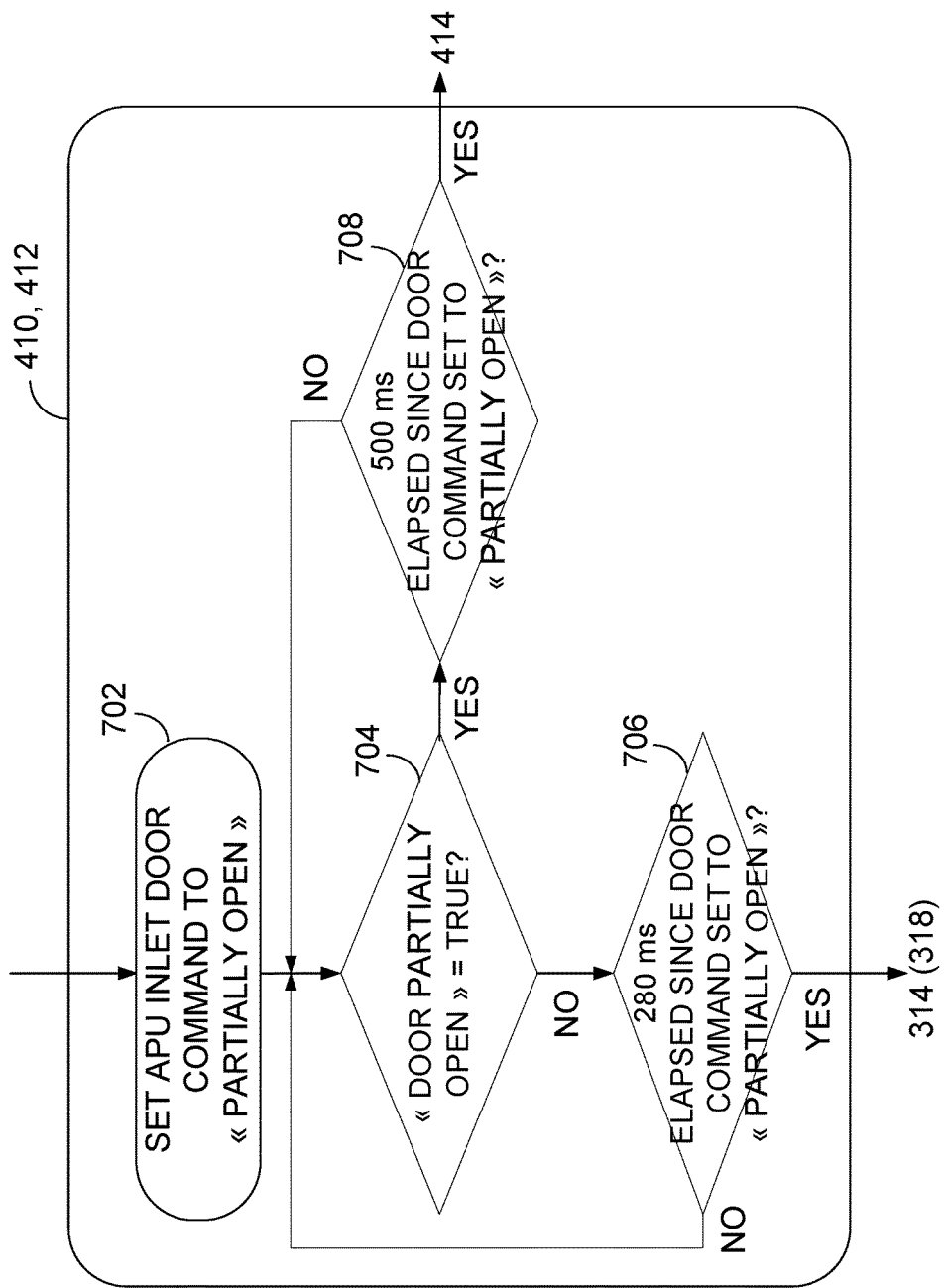
FIG. 8 is a flowchart of the steps of FIG. 5 of testing and assessing the success of a "Partially Open" position command as part of the inlet door system built-in test.

Referring now to FIG. 8, steps 410 and 412 of FIG. 5 of testing the "Partially Open" command and assessing whether the test is successful comprise outputting a control signal comprising instructions to set the APU inlet door command to "Partially Open" (step 702). The next step 704 is then to assess whether the feedback signal associated with the "Partially Open" position command (referred to herein as "DOOR PARTIALLY OPEN" signal) is indicating "True". If this is not the case, the next step 706 is to assess whether a first predetermined time period has elapsed since the door command was set to "Partially Open". If the result of the assessment performed at step 706 is negative, the method flows back to step 704. Steps 704 and 706 are then repeated until it is determined that the first predetermined time period has indeed elapsed since the door command was set to "Partially Open", in which case the method flows back to step 314 (or optionally step 318) of FIG. 4. If it is determined at step 704 that the "DOOR PARTIALLY OPEN" feedback signal is indicating "True", the next step 708 is to assess whether the second predetermined time period has elapsed since the door command was set to "Partially Open". If it is determined at step 708 that the second predetermined time period has not elapsed since the door command was set to "Partially Open", the method flows back to step 704. Otherwise, the next step 414 of FIG. 5 is to test the "Not Powered" command.

Figure 9:
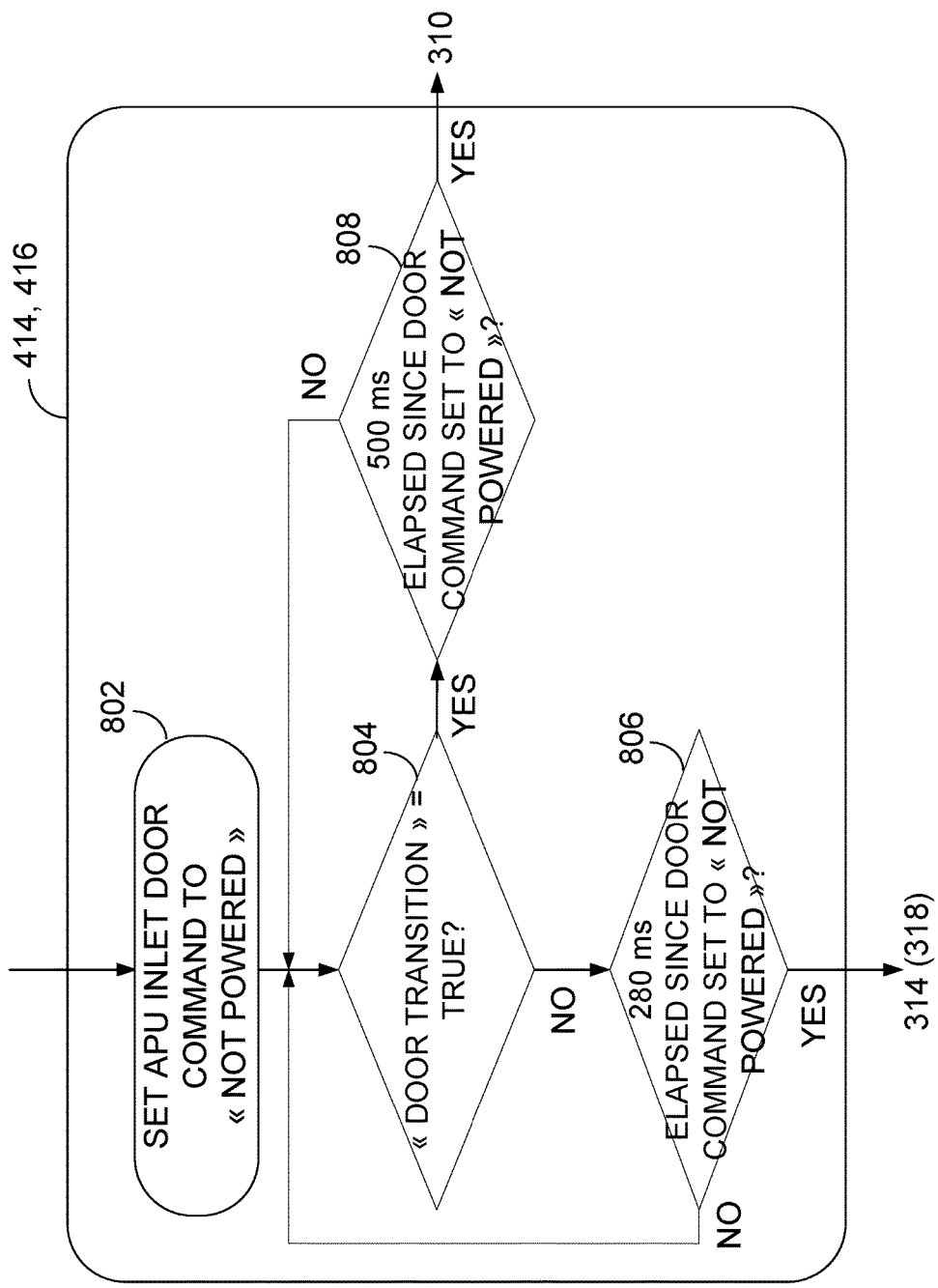
FIG. 9 is a flowchart of the steps of FIG. 5 of testing and assessing the success of a "Not Powered" command as part of the inlet door system built-in test.

Referring now to FIG. 9, steps 414 and 416 of FIG. 5 of testing the "Not Powered" command and assessing whether the test is successful comprise outputting a control signal comprising instructions to set the APU inlet door command to "Not Powered" (step 802). The next step 804 is then to assess whether the feedback signal associated with the "Not Powered" command (referred to herein as "DOOR TRANSITION" signal, which indicates that the APU inlet door is in none of the predetermined positions) is indicating "True". If this is not the case, the next step 806 is to assess whether the first predetermined time period has elapsed since the door command was set to "Not Powered". If the result of the assessment performed at step 806 is negative, the method flows back to step 804. Steps 804 and 806 are then repeated until it is determined that the first predetermined time period has indeed elapsed since the door command was set to "Not Powered", in which case the method flows back to step 314 (or optionally step 318) of FIG. 4. If it is determined at step 804 that the "DOOR TRANSITION" feedback signal is indicating "True", the next step 808 is to assess whether the second predetermined time period has elapsed since the door command was set to "Not Powered". If it is determined at step 808 that the second predetermined time period has not elapsed since the door command was set to "Not Powered", the method flows back to step 804. Otherwise, the method flows to the step 310 of FIG. 4 of allowing APU operation.

It can be seen from FIG. 5, FIG. 6, FIG. 7, FIG. 8, and FIG. 9 that, using the system and method described herein, each command ("Fully Open", "Partially Open", "Closed", and "Not Powered") is output for a predetermined time period (e.g. 500 ms). The BITE test is considered successful if the proper feedback signals are received from the APU inlet door system before expiry of another predetermined time period (e.g. 280 ms). APU operation is then allowed if the BITE test is successful. Otherwise, the APU operation is prevented and a fault message may be generated accordingly to cause troubleshooting of the APU inlet door system.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for operating an inlet door of an auxiliary power unit, the method comprising:
   outputting a control signal comprising at least one inlet door command;
   receiving, in response to the at least one inlet door command, at least one feedback signal;
   comparing the at least one received feedback signal to the at least one inlet door command;
   if the at least one received feedback signal matches the at least one inlet door command, allowing operation of the auxiliary power unit; and
   inhibiting operation of the auxiliary power unit otherwise.

2. The method of claim 1, wherein the control signal is output to an actuator coupled to the inlet door and operative to move the inlet door amongst a plurality of positions, the at least one inlet door command comprising instructions for commanding the inlet door to at least one of the plurality of positions.

3. The method of claim 2, wherein the control signal is output as comprising instructions for the at least one feedback signal to be generated in response to the at least one inlet door command without the inlet door being moved to the at least one of the plurality of positions.

4. The method of claim 1, wherein the control signal is output as comprising instructions for sequentially commanding the inlet door to a fully open position, commanding the inlet door to a partially open position, commanding the inlet door to a closed position, and sending no command to the inlet door.

5. The method of claim 1, further comprising:
   outputting the control signal for a first predetermined time period; and
   waiting a second predetermined time period for the at least one feedback signal to match the at least one inlet door command, the second predetermined time period smaller than the first predetermined time period.

6. The method of claim 1, further comprising, if the at least one received feedback signal does not match the at least one inlet door command:
   determining whether the inlet door is currently locked open;
   if the inlet door is locked open, disregarding data received in response to the at least one inlet door command; and
   inhibiting operation of the auxiliary power unit otherwise.

7. The method of claim 1, wherein the control signal is output once after completion of a power-up phase.

8. A system for controlling an inlet door of an auxiliary power unit, the system comprising:
   a memory; and a processing unit coupled to the memory and configured to:
   output a control signal comprising at least one inlet door command;
   receive, in response to the at least one inlet door command, at least one feedback signal;
   compare the at least one received feedback signal to the at least one inlet door command;
   if the at least one received feedback signal matches the at least one inlet door command, allow operation of the auxiliary power unit; and
   inhibit operation of the auxiliary power unit otherwise.

9. The system of claim 8, wherein the processing unit is configured to output the control signal to an actuator coupled to the inlet door and operative to move the inlet door amongst a plurality of positions, the at least one inlet door command comprising instructions for commanding the inlet door to at least one of the plurality of positions.

10. The system of claim 9, wherein the processing unit is configured to output the control signal as comprising instructions for the at least one feedback signal to be generated in response to the at least one inlet door command without the inlet door being moved to the at least one of the plurality of positions.

11. The system of claim 8, wherein the processing unit is configured to output the first control signal as comprising instructions for sequentially commanding the inlet door to a fully open position, commanding the inlet door to a partially open position, commanding the inlet door to a closed position, and sending no command to the inlet door.

12. The system of claim 8, wherein the processing unit is configured to:
   output the control signal for a first predetermined time period; and
   wait a second predetermined time period for the at least one feedback signal to match the at least one inlet door command, the second predetermined time period smaller than the first predetermined time period.

13. The system of claim 8, wherein, if the at least one received feedback signal does not match the at least one inlet door command, the processing unit is configured to:
   determine whether the inlet door is currently locked open;
   if the inlet door is locked open, disregard data received in response to the at least one inlet door command; and
   inhibit operation of the auxiliary power unit otherwise.

14. The system of claim 8, wherein the processing unit is configured to output the control signal once after completion of a power-up phase.

15. A non-transitory computer readable medium having stored thereon program code executable by a processor for:
   outputting a control signal comprising at least one inlet door command;
   receiving, in response to the at least one inlet door command, at least one feedback signal;
   comparing the at least one received feedback signal to the at least one inlet door command;
   if the at least one received feedback signal matches the at least one inlet door command, allowing operation of the auxiliary power unit; and
   inhibiting operation of the auxiliary power unit otherwise.

* * * * *